United States Patent [19]

Zinck

[11] Patent Number: 4,624,194
[45] Date of Patent: Nov. 25, 1986

[54] PROBE FOR BREAKING AND INJECTING SOIL

[76] Inventor: Eugen Zinck, Hueffelsheimer Strasse 2, D-6550 Bad Kreuznach, Fed. Rep. of Germany

[21] Appl. No.: 641,967
[22] PCT Filed: Dec. 10, 1983
[86] PCT No.: PCT/DE83/00207
§ 371 Date: Aug. 2, 1984
§ 102(e) Date: Aug. 2, 1984
[87] PCT Pub. No.: WO84/02251
PCT Pub. Date: Jun. 21, 1984

[30] Foreign Application Priority Data

Dec. 11, 1982 [DE] Fed. Rep. of Germany ....... 3245912

[51] Int. Cl.⁴ .................................................. A01C 23/02
[52] U.S. Cl. ................................................... 111/7.2
[58] Field of Search .................. 111/6, 7, 7.1–7.4, 111/89, 92

[56] References Cited

U.S. PATENT DOCUMENTS

| | | | |
|---|---|---|---|
| 2,083,153 | 6/1937 | Irish | 111/7.1 |
| 2,323,773 | 7/1943 | Irish | 111/7.1 |
| 3,107,638 | 10/1963 | Johnston | 111/7.1 |
| 3,108,439 | 10/1963 | Reynolds et al. | 111/7.1 X |
| 3,148,643 | 9/1964 | Mussett et al. | 111/7.4 |
| 3,886,874 | 6/1975 | Platz | 111/7.4 |
| 4,074,858 | 2/1978 | Burns et al. | 111/6 X |
| 4,429,647 | 2/1984 | Zinck | 111/7.1 X |

FOREIGN PATENT DOCUMENTS

| | | | |
|---|---|---|---|
| 2716456 | 8/1978 | Fed. Rep. of Germany | 111/7.4 |
| 1399564 | 4/1965 | France | 111/7.1 |
| 75359 | 4/1946 | Norway | 111/7.4 |
| 276937 | 11/1951 | Switzerland | 111/7.4 |
| 1379647 | 1/1975 | United Kingdom | 111/6 |

*Primary Examiner*—James R. Feyrer
*Attorney, Agent, or Firm*—Schwartz, Jeffery, Schwaab, Mack, Blumenthal & Evans

[57] ABSTRACT

The apparatus is intended for the breaking of ground used for the cultivation of plants with a probe, whereby by means of a rapid closing valve compressed air and by means of an injector valve a substance may be introduced into the soil in an impact like manner. The rapid closing valve is arranged in the upper area and the injector valve in the lower area of an intermediate reservoir for the substance. The rapid closing valve is followed by an injector tube with a compressed air outlet. The injector tube may be raised in case of an open rapid closing valve with a delay in time from an injector valve seat of the intermediate reservoir to release the injector valve.

20 Claims, 7 Drawing Figures

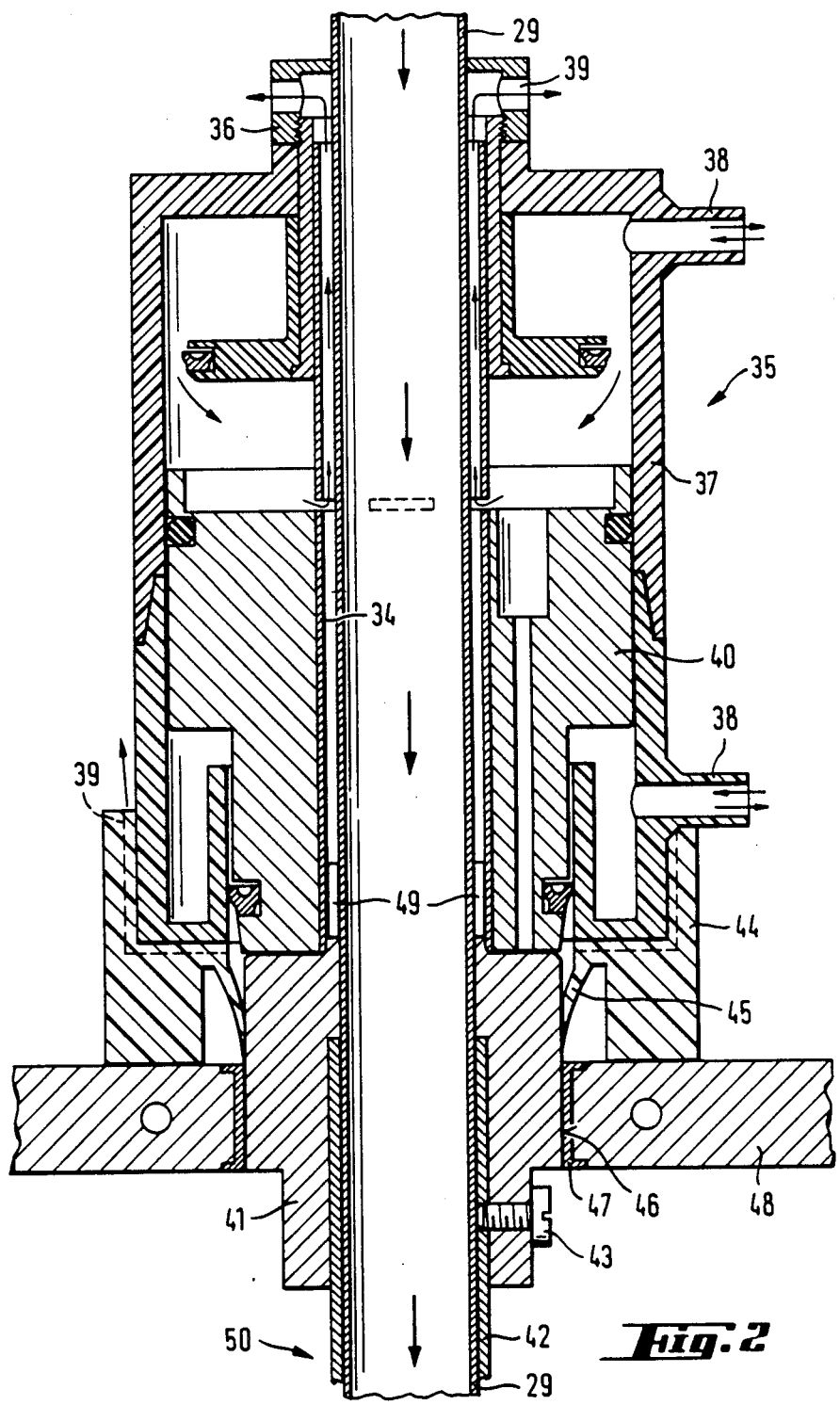

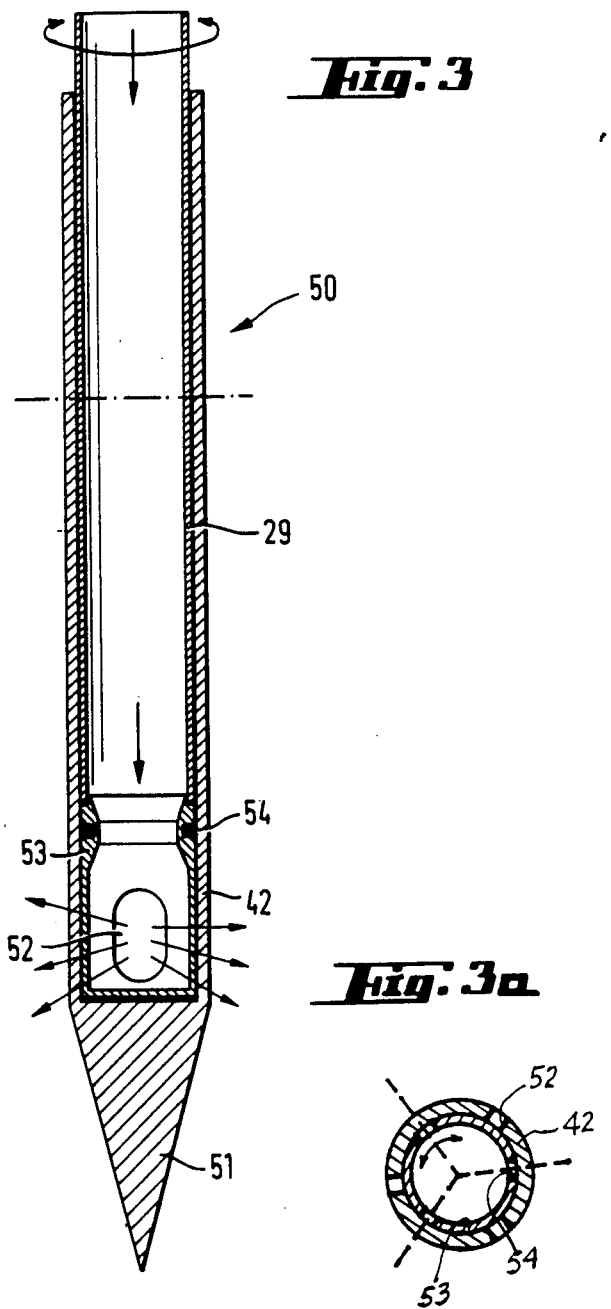

4,624,194

PROBE FOR BREAKING AND INJECTING SOIL

BACKGROUND OF INVENTION

The invention relates to an apparatus for the breaking of soil used for the cultivation of plants.

In a proven soil working process (DE No. 2 742 606) compressed air is injected in a sudden impact by means of a rapid closing valve through a probe into the ground, whereby the latter is broken up. By means of the flow of air a substance, for example a filler or a fertilizer, may be injected in the process into the ground through an injection valve, from a separate reservoir or the like, through the probe, so that the lining of channels in the broken ground and the introduction of a fertilizer with a supply of oxygen is possible. In view of the separate supply of the substance from a reservoir remote from the apparatus, interference with the introduction of the substance into the ground cannot be excluded and difficulties may arise in the manipulation of the apparatus.

It is the object of the invention to provide an apparatus having simplified handling, together with improved controls with regard to the optimum introduction of compressed air and a supplemental substance into the soil.

Preferred embodiments and further developments, together with further advantages and essential details of the invention will become apparent from the description hereinafter and the drawings attached hereto, said drawings showing preferred forms of embodiment as examples.

BRIEF DESCRIPTION OF THE APPLICATION DRAWING

FIG. 1 shows an upper part with an intermediate reservoir of the apparatus according to the invention in a partially sectioned side elevational view, FIG. 1a is a side elevation view of a portion of FIG. 1, showing means for rotating the inner tube positioned below the reservoir relative to the fitting within which it is positioned.

FIG. 2 is a partially sectioned view of the apparatus according to the invention and forming a continuation of the bottom of FIG. 1, with a probe driver located under the intermediate reservoir of FIG. 1, FIG. 3 is a partially sectioned view of the lower portion of the probe, with FIG. 3 being a continuation of the bottom of FIG. 2, FIG. 3a is a horizontal sectional view more clearly showing the manner in which compressed air is discharged from the probe, and FIG. 4 is an upper part with the intermediate reservoir of a further embodiment of the apparatus according to the invention, in a partially sectioned side elevational view similar to FIG. 1.

DETAILED DESCRIPTION OF THE PREFERRED EMBODIMENTS

Figure 1:
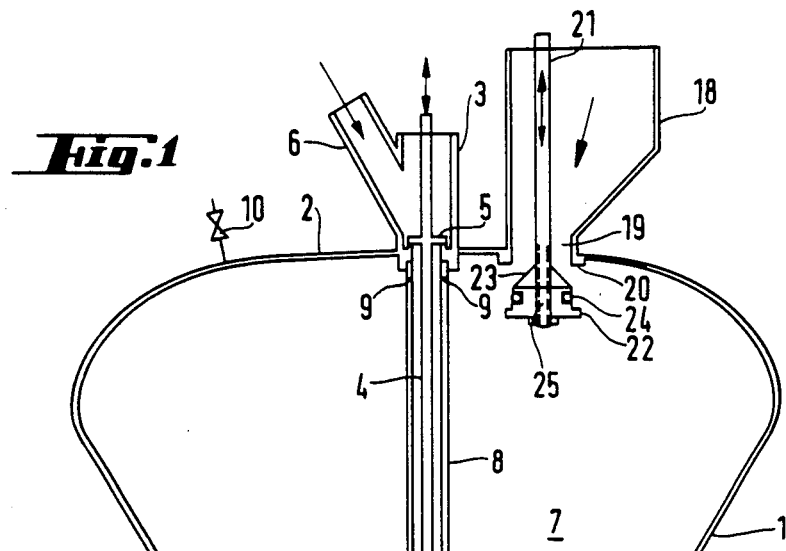

The apparatus shown as examples in the drawings are used to break up soil for the cultivation of plants, whereby compressed air generated, for example, by a compressor is introduced to a depth of approximately 50 cm to about 85 cm or deeper into the ground suddenly in the form of an eruptive impact, so that the soil is broken and loosened within a defined area. In the process the ground is broken and rendered permeable, in particular along structurally predetermined fracture lines so that the soil structure itself is not damaged. Channels in the eruptively loosened areas may be lined with the aid of the apparatus according to the invention by means of fillers introduced immediately after the onset of the pressure impact and thus supported. However, different substances, such as, for example, a fertilizer or a healing substance, may also be introduced shortly after the onset of the pressure impact into the channels of the eruptively loosened area, whereby by means of the simultaneous introduction of oxygen the optimum preparation of the soil is obtained.

In FIG. 1 according to the invention an intermediate reservoir 1 is provided for the substance, said reservoir 1 having essentially the configuration of a cone resting on its top, or a closed funnel. On the upper wall 2 of the intermediate reservoir 1 a rapid closing valve 3 is arranged in the vertical center axis of said reservoir 1, with a packing disk 5 being formed on a lifter rod 4. The lifter rod 4 is movable in the direction of the axial double arrows. In the course of an upward movement the packing disk is lifted and abruptly releases the rapid closing valve 3, so that compressed air may flow downward through the connector fitting 6 of the valve. In the inner chamber 7 of the intermediate reservoir 1, which is made preferably of a transparent synthetic plastic material, a vertical tubular sleeve 8 is located, fastened to the bottom side of the rapid closing valve 3. A plurality of transverse bores 9 are provided near the top of the tubular sleeve 8, through which a portion of the compressed air may flow into the inner chamber 7 upon the opening of the valve 3, so that a pressure cushion is applied to the substance present in the intermediate reservoir 1, whereby the substance is enabled to flow from the reservoir 1 under pressure. To prevent an excessive rise of pressure in the intermediate reservoir 1 and to always maintain it under a maximum permissible value, a relief valve 10 is arranged on top of the intermediate reservoir 1, which may be adjusted within a certain range.

The lifter rod 4 extends within the tubular sleeve 8 downward and is provided at its end with threads 11, to which an injector tube 12 is fastened. For this purpose, two threaded nuts 13, 13' are provided. Between the upper threaded nut 13 and the upper end of the injector tube 12 a helical compression spring 14 is arranged. The injector tube 12 is supported displaceably in the lower terminal area of the tubular sleeve 8 and is guided thereby in the course of axial movement of the lifter rod 4. The injector tube 12 is thus coupled by means of the lifter rod 4 to the rapid closing valve 3. The lower end of the injector tube 12 is designed in a conical form as a nozzle like outlet for the compressed air, with its wall pressured in a tightly closing manner by the force of the compression spring 14 against an injector valve seat 16 in the area of the lower tapering of the intermediate reservoir 1. The compressed air outlet 15 and the injector valve seat 16 thus form an injection valve 55, which is opened in a delayed manner with respect to the rapid closing valve 3, thereby releasing the substance for its exit from the intermediate reservoir 1. The air flowing at a high velocity from the compressed air outlet 15 is thereby mixed into the substance by a suction effect. By adjusting the threaded nuts 13 and 13', respectively, the force of the compression spring 14 may be preselected according to need and a clearance may be set, whereby the time sequence between the breaking of the soil and the intermixing and introduction of the substance may be regulated as needed.

The intermediate reservoir 1 has a fitting 18 with a filler orifice 19 on top of its upper wall 2 for the feeding of the substance into the reservoir 1. The filler orifice 19 is bounded by a holding rim 20 facing the inner chamber 7. A closure 22 is arranged on a rod 21 penetrating the feeder orifice 19, the diameter of said closure being larger than the diameter of the feeder orifice 19. The closure is pressured from the direction of the inner chamber against the holding rim 20 by the axial displacement of the rod 21. With the closure 22 open, the substance may flow over the conical surfaces 23 of the closure into the inner chamber 7. A gasket 24 is provided for the sealing of the closure 22. The closure 22 is supported adjustably by means of the threads 25 on the rod 21.

At its lower, tapering end the intermediate reservoir 1 has a fastening fitting 26 comprising a recess 27 in which a guide sleeve 28 is located. In the guide sleeve 28 an inner tube 29 is rotatably and displaceably supported, with its upper end located under the injector valve seat 16. By means of a groove ring gasket 30 surrounding the inner tube 29 in the recess 27 over the guide sleeve 28 the necessary sealing is obtained in this area.

Figure 1B:
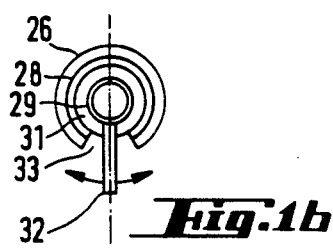
Figure 1A:
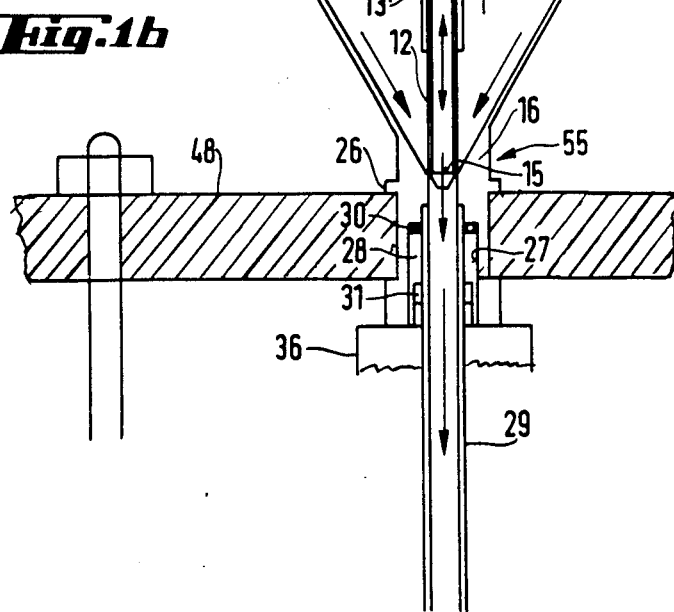

The inner tube 29 has a collar 31 which is also located in the area of the guide sleeve 28 and is equipped, as shown by FIGS. 1a and 1b, with a rotating lever 32. The rotating lever 32 protrudes through openings 33 in the guide sleeve 28 and the fastening fitting 26. The openings 33 are large enough so that the rotating lever 32 may be swivelled in different directions whereby the inner tube may be moved both slightly around its axis and displaced in the axial direction.

The intermediate reservoir 1 is fastened to the fitting 26 by means of a nut 36, which forms part of a control tube 34 of a probe driver 35, to the housing 37 of the probe driver 35, reference being made to FIG. 2. The probe driver 35 is operated pneumatically and has corresponding fluid connections 38 and exhaust lines 39 for the control of a ram body 40 moving back and forth in the housing 37. The ram body 40 acts upon an anvil 41, with the jacket tube 42 surrounding the inner tube 29 being fastened to the anvil by means of a screw 43. A spacer ring 44 is provided at the bottom part of the housing 37, and comprises sealing lips 45 resting against the circumferential surface of the anvil 41. The anvil 41 itself is guided in a bushing 47 arranged in a holding strap 48. Between the control tube 34 and the inner tube 29 a plurality of spacer tongues 49 are provided, so that a satisfactory alignment is assured. The ram body 40 thus acts exclusively on the anvil 41 so that the impact energy is transmitted exclusively over the extent of the jacket tube 42 constituting a part of the probe 50. In this manner a high degree of utilization of the energy is achieved, as the impact energy is not being consumed otherwise.

The jacket tube 42, in which the inner tube 29 is supported rotatably, has according to FIG. 3 a pointed forward end 51. At a short distance below the inner tube 29, outlet openings 52 are provided in the jacket tube 42, in a radially facing manner. The inner tube 29 is surrounded by a closure head 53, with a gasket 54 acting during the driving of the probe tube into the ground against the inner surface of the jacket tube 42. As shown in FIG. 3a, which is a sectional view through the probe near the bottom thereof, the closure head 53 is formed with openings 52a which can be aligned with the openings 52 during the release of compressed air. If no compressed air and no substance is being introduced into the soil by the probe 50, the inner tube 29 is rotated by means of the rotating lever 32 in the jacket tube 42 so that the outlet openings 52 are sealed from the openings 52a. For the release of the compressed air and/or the substance the inner tube 29 is rotated so that the openings 52 and 52a are aligned. The size of the opening 52 is exaggerated in FIG. 3.

In the embodiments described herein the probe 50, the probe drive 35, and the intermediate reservoir 1 have a configuration such that a structurally compact apparatus is provided, operated and serviced by a single person. It may be further especially advantageous to design and apply the apparatus according to the invention so that it may be mounted on a hydraulic lifting device of a tractor and moved with it, with the probe 50 being located in a practically parallel manner below the surface and capable of being displaced continuously through the soil. In the process, the compressed air and/or the substance are released abruptly at intervals in the form of eruptive impacts from the probe 50. In this configuration the intermediate reservoir 1 may be fastened over the probe 50 to the lifting device of the tractor, optionally together with accessories, such as for example a compressor and substance reservoirs. A probe driver is usually not required in this case, as the probe 50 may be inserted into the ground and retracted by means of the hydraulic lifting device.

The apparatus according to the invention affords the advantage that the soil to be utilized for the cultivation of plants may be loosened in a more ecosystematic manner than with conventional ploughs or the like. The energy required is much reduced compared to ploughing. A significant further advantage consists in the fact that fissures and cracks in the ground are lined in an optimum manner by the immediately following introduction of a substance. The lining of ground fissures in this manner has a long term effect. In particular, after repeated applications a dense supply channel network is created, offering the possibility of requiring only a flat seed bed preparation during subsequent processing.

In operation, working of the soil is carried out by placing the tip of the probe 50 on the ground at the location at which the breaking of the soil is to begin. The probe 50 is then, by means of the probe driver 35, powered by compressed air controlled by the valve for the compressed air. To produce a finely structured and narrowly limited break and for the introduction of lining substances, organic substances, fertilizers and healing agents, the probe 50 may be introduced into the ground to a depth of about 45 to 50 cm. By means of subsequent deeper penetration to about 85 cm and deeper, a wider break may be obtained, into the fissures and cracks of which again lining substances, mineral fertilizers and healing substances may be introduced from the intermediate container 1 of the apparatus of the invention. The probe 50 may thus be inserted into the ground to an essentially arbitrary depth so that for the breaking of the ground clearly defined compression zones, linings, fertilizer and healing zones may be obtained.

Following the insertion of the probe 50 to the appropriate depth, the intermediate reservoir 1 is filled. The outlet openings 52 in the area of the tip of the probe 50 are then aligned with the openings 52a formed in the closure head 53 by rotating the inner tube 29. Subsequently, the rapid closing valve 3 is actuated. Compressed air passes through the tubular sleeve 8, the injector tube 12 to the compressed air outlet, the inner tube 29, and is released through the outlet openings 52. Thus, by means of the abrupt eruptive impact fissures, cracks and structural lines are formed in the soil, through which gas molecules may penetrate and the ground is broken and expanded. The time required is merely a small fraction of a second. Shortly following the actuation of the rapid closing valve 3 the access to the substance is opened by the raising of the injector tube 12. The nozzle-like compressed air outlet 15 is lifted from the seat 16 of the injector valve so that the injection valve 55 is opened. This opening is effected automatically by the rapid actuation of the rapid closing valve 3 by way of the lifter rod 4, with the lower threaded nut 13' abutting against the bushing 13" to which the injector tube 12 is fastened. Thus, during the further raising of the lifter rod 4 the injector tube 12 is also drawn upwards and the compressed air outlet 15 is raised from the injector valve seat 16, thereby opening the injector valve 55. The time delay for the discharge of the substance may be selected by means of the adjustable threaded nut 13' at the lower end of the lifter rod 4, so that the compressed air outlet 15 is raised after a lifting motion of about 2 to 3 mm from the injector valve seat 16. In this manner it is assured that the substance is mixed with the compressed air exactly at the instant of the breaking of the ground, i.e. the instant of the greatest energy release and the most extensive widening of the fissures and cracks and the highest flow velocity of the air. The air transports the substances mixed with it, which may also be in the form of synthetic plastic granules, into the fissures and cracks of the ground. Powdered substances are deposited in a fine distribution onto the humid walls, and granular substances and granules remain suspended in narrow locations and fill the fissures and cracks. The entire process, wherein for the application of about 3 liters of the substance approximately 30 liters of air compressed to 20 bar are required, according to which about 600 liters are flowing through the soil, lasts for between three-quarters to one-and-a-half seconds.

Following the introduction of the compressed air and the substance, the probe is closed by the rotation of the inner tube 29. The probe 50, as described above, may then be inserted deeper into the ground or retracted by means of the device and subsequently driven into the ground at another location.

Systematic practical applications indicated that the efficiency of the breaking and lining of the ground is a function of the rate of the application of the energy potential and the compressed air, respectively, and subsequently of the substance. The dimensioning of the apparatus according to the invention is determined in each case by the application. In practice, this signifies that an individual probe for breaking the ground, for example, to a depth of 50 cm in a powerful vehicle, must be dimensioned in the same manner as a corresponding manual device. At such working depths a minimum potential is required for the optimum breaking of the ground. A further increase in potential cannot effect an additional appreciable rise in the effect and is thus practically meaningless. It has been found that an energy potential of about 30 liters of air prestressed to 20 bar is optimal for a working depth of 50 cm. For its release, a passage of at least 5 cm$^2$ should be assured in the course of the process at all locations. With such an apparatus at the aforecited potential, approximately 3 liters of a substance may be introduced with absolute reliability into the widened fissures and cracks. By the process, approximately 2 m$^2$ of fissure walls, and even far more, may be coated and lined and, for example, powdered with lime fertilizer and maintained open.

The feed line from the compressed air vessel to the rapid closing valve should be as short as possible and provided with a large passage cross section. Operating errors are excluded by means of appropriate safety measures (locks) so that a reliable course of the process is assured. The probe driver 35 may be actuated only after release in the striking position of the anvil 41 acting on the jacket tube 42. The inadequate releasing of the rapid closing valve 3 is prevented by a lock which is opened when the inner tube 29 is rotated into its corresponding open position to uncover the outlet openings. The reverse rotation of the inner tube 29 releases the lift valve of the lifting cylinder.

Figure 4:
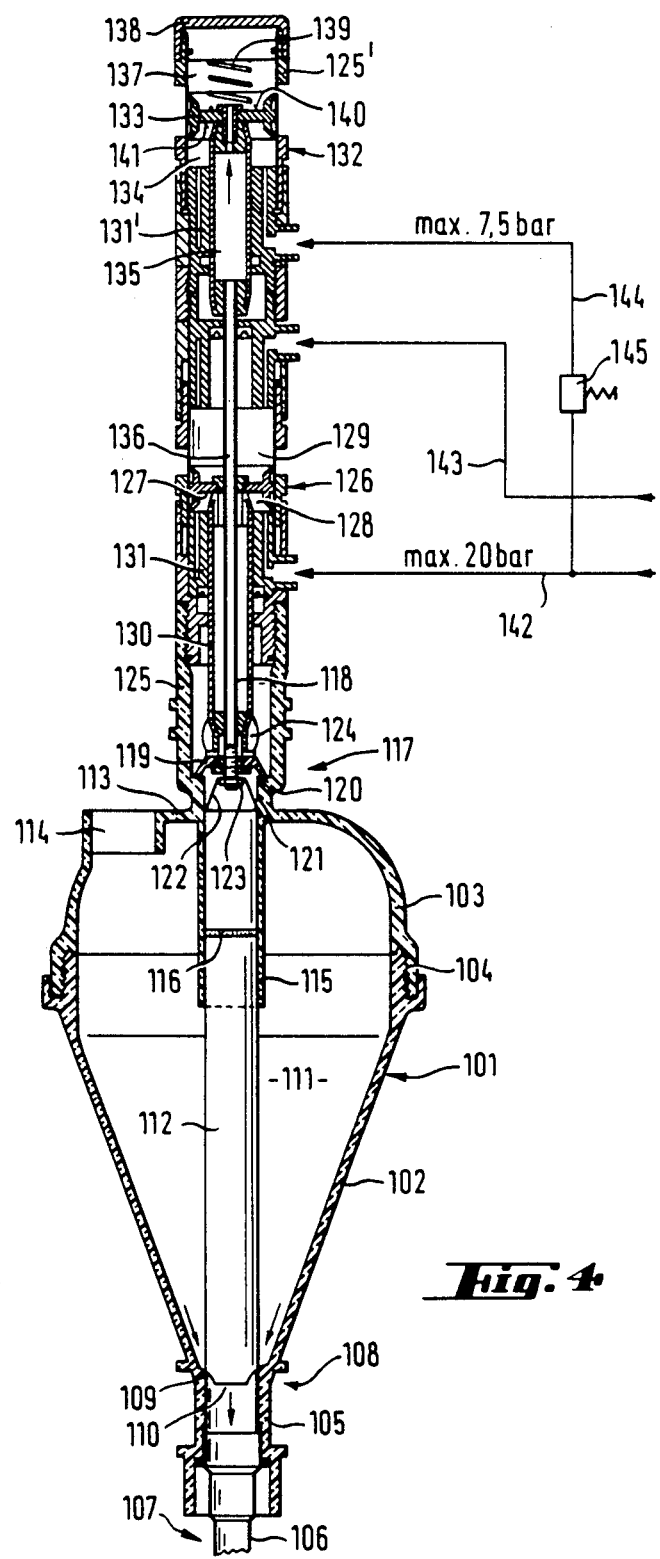

The configuration shown in FIG. 4 of the apparatus according to the invention is essentially similar to the aforedescribed embodiment, but here there is no mechanical coupling between the rapid closing valve and the injection valve. In this configuration, an entirely pressure dependent forced control of the opening of the injection valve for the introduction of the substance into the soil is provided for increased operating safety. The funnel shaped intermediate reservoir 101 consists of a lower part 102 and an upper part 103, which are screwed together by means of threads 104. A mounting fitting 105 is formed on the bottom taper of the lower part 102 of the reservoir 101, with the inner tube 106 of the probe 107 insertable in the ground to be broken. In the lower taper of the intermediate reservoir 101 the injector valve 108 is arranged, consisting of the injector valve seat 109 formed on the lower part 102 and the conical wall of the nozzle shaped compressed air outlet 110 of the injector tube 112 arranged in the inner chamber 111 of the intermediate reservoir 101, coaxially with its vertical center axis.

On one side of the vertical upper wall 113 a relief valve 114 is located. The upper wall 113 is formed with a tubular sleeve 115 coaxial with the vertical center axis of the reservoir and protruding into the inner chamber 111. The sleeve 115 guides the injector tube 112 in an axially displaceable manner, with the tube being sealed by means of an annular gasket 116.

On the upper wall 113 of the intermediate reservoir 101 a rapid closing valve 117 is arranged. The valve 117 includes a seal 119 arranged on the lower end of the lifter rod 118, with the outer rim of said seal resting against a valve seat 120. Underneath the seal 119 a transverse bore 121 is located on the upper part of the tubular sleeve 115 for the ventilation of the inner chamber 111. The upper end 122 of the injector tube 112 is fastened to the lower end of the lift rod 118 by means of a threaded nut 123, whereby a fine adjustment for an exact sealing function on the injector valve seat 109 may be effected. Immediately over the seal 119 of the rapid closing valve 117 the orifice 124 of the connector fitting for the compressed air supplied by the compressor is provided in a housing wall of the rapid closing valve 117.

A pneumatic cylinder 126 is screwed coaxially onto the essentially tubular valve housing 125, with piston 127 being guided in an axially adjustable manner in the cylinder 126. The piston 127 bounds in the downward direction a pressure chamber 128 and in the upwards direction a counter pressure chamber 129. On the piston 127 a downwardly directed piston tube 130 is arranged, which is guided in a sealed manner in a sleeve 131. The gasket 119 of the rapid closing valve 117 is fastened to the lower end of the tube 130 with an appropriate connecting part.

A compressed air cylinder 132 is screwed coaxially onto the pneumatic cylinder 126, with a lift piston 133 being supported in an axially displaceable manner in the cylinder. The lift piston 133 limits in the downward direction a work chamber 134 and has a downwardly directed tappet tube 135 guide sealingly in a sleeve 131' and to the lower end of which the piston rod 118 is fastened, again in a sealed manner.

The piston rod 118 has an air line in the form of a continuous bore in the longitudinal dirction, so that the free passage of air from the injector tube 112 through the lift piston rod 118, the tappet tube 135 and a bore of the piston 133 into an impact pressure chamber 137 is assured. The impact pressure chamber 137 of the compressed air cylinder 132 is also bounded by the lift piston 133. On top, the housing 125' of the compressed air cylinder 132 is closed off by a screwed-on cover 138. A compression spring 139 is located in the impact pressure chamber 137, resting on the one hand against the cover 138 and acting with its lower end against the impact pressure surface 140 of the lift piston 133. This impact pressure surface 140 is significantly larger than the downwardly directed working surface 141 of the lift piston 133.

Both the pressure chamber 128 of the pneumatic cylinder 126 and the counter pressure chamber 129 and the work chamber 134 of the compressed air cylinder 132 are provided with separate compressed air lines 142, 143, and 144. The compressed air is preferably delivered through a directional valve simultaneously by way of the pressure line 142 and the pressure line 144 in the pressure chamber 128 and the work chamber 134. In the pressure line 144 leading to the compressed air cylinder 132, a pressure reducing valve 145 is located, which reduces the pressure of the compressed air so that compressed air is introduced in the work chamber 134 of the compressed air cylinder 132 at a maximum pressure of 7.5 bar, while the pressure of the compressed air introduced into the pressure chamber 128 of the pneumatic cylinder 126 is substantially higher, up to a maximum of 20 bar.

In the operation of the embodiment shown in FIG. 4, the compressed air to the compressed air lines 142 and 144 is controlled and actuated by means of a manual valve or a directional valve. The control is such that the compressed air arrives simultaneously in the pressure chamber 128 and the work chamber 134. As the pressure in the pressure chamber 128 of the pneumatic cylinder 126 is higher, the piston 127 is pressured upward, so that the gasket 119 is raised from the valve seat 120 and the rapid closing valve 117 is abruptly opened. Since the force directed against the lift piston 133 of the compressed air cylinder 132 in the upward direction is substantially lower and the compression spring 139 is additionally pressuring the the lift piston 133 downward, the injector tube 112 is pressured against the injector valve seat 109 by means of the tappet tube 135 and the lift rod 118 penetrating through the piston 127 and the gasket 119 in the slide bushing in an axially displaceable manner. The injector valve 108 is therefore closed. Following the opening of the rapid closing valve 117, the compressed air flows through the opening 124 into the injector tube 112 and through the compressed air outlet 110 into the probe 107. The impact pressure builds up prior to the breaking of the ground in the probe 107 and the injector tube 112 passes through the air line 136 in the lift rod 118 into the impact pressure chamber 137 of the compressed air cylinder 132 and increases the downward pressure on the lift piston 133. The injector tube 112 is thus pressured with an enhanced force against the injector valve seat 109, thereby assuring an absolutely tight sealing of the injector valve 109. The opening of the injector valve 108 and thus the passage of compressed air from below into the inner chamber 111 of the intermediate reservoir 101, together with its subsequent escape through the relief valve 114 (preferably set to about 3.4 bar) by the dynamic pressure building up in the case of a hard soil encountered by the probe 107, is thereby prevented with a high degree of security. The pressure in the probe 107 is thus available exclusively for the breaking of the ground.

Following the breaking of the ground by the compressed air introduced, the pressure in the probe 107, the injector tube 112 and thus in the impact pressure chamber 137, declines. As soon as the pressure is reduced to about 4 bar, the lift piston 133 is displaced upward by the compression force applied in the work chamber against the compression spring 139, so that the injector tube 112 is raised from the injector valve seat 109 by means of the tappet tube 135 and the lift rod 118. The injection valve 108 is thereby opened and the substance located in the intermediate reservoir 101 is now able to flow downwards into the probe 107 by virtue of the suction created by the flow of air at the compressed air outlet 110, and may be inserted into the ground. The lining, that is, the introduction of the substance and its distribution in the soil is reduced to a pressure of less than 3.5 bar in the entire supply of air and no longer optimally effective. The controlling compressed air and the additionally provided closing springs therefore terminate the process by closing the injection valve 108 and subsequently the rapid closing valve 117. In view of the aforementioned sequence, the clogging of the apparatus by substance residues is prevented. Furthermore, the compressed air control specified by the invention excludes the creation of a flow of compressed air from below and consequently an undesirable pressure buildup in the intermediate reservoir.

The injector valve 108 opens as a matter of principle following the breaking of the ground only. As long as there is no breakup of the soil, the injector valve 108 cannot open and remains closed with an enhanced security and closing force. Only in case of a drop of pressure in the probe 107 and the injector tube 112 is the injector valve 108 able to open. The very high air flow velocity generated upon the opening of the injector valve 108 produces a reduction of pressure in the area of the injector valve seat 109, and also the intermediate reservoir 101, so that the substance intermediately stored in said reservoir is able to pass from the funnel shaped intermediate reservoir 101 downwardly without difficulty. The actuation of the rapid closing valve 117 and the injector valve 108 is thus effected according to the invention by the separate pneumatic cylinder 126 and compressed air cylinder 132, wherein the delay in time of the opening of the injection valve 108 is controlled by the pressure drop after the breaking of the ground. To close the injector valve 108 a servofunction is applied through the impact pressure connection to the impact pressure chamber 137, said function assuring a high closing pressure for the injector valve 108. The injector valve 108 is thus opened exclusively as a function of pressure. The magnitude of the impact pressure itself actuates and determines the point in time of the opening of the injector valve 108. This provides a pressure drop control of the injector valve determined by the breaking of the ground, which assures that even in the case of different soil characters (solid baked ground, sandy soil) satisfactory operation is always obtained and the insertion of the substance is effected at exactly the right moment and only if the compressed air has already broken the ground.

I claim:

1. Apparatus for pneumatically loosening and breaking open soil and adapted to be used for the cultivation of plants, comprising:
   (a) a reservoir adapted to contain a substance that can be entrained with compressed air for partially filling the passages resulting from the breaking up of the soil;
   (b) a rapid closing valve mounted adjacent the upper end of said reservoir, and means for opening and closing said rapid closing valve;
   (c) an injector valve mounted adjacent the lower end of said reservoir and having a valve seat;
   (d) a vertically reciprocable injector tube extending upwardly through said reservoir, said injector valve being in flow communication at its upper ends with compressed air upon the opening of said rapid closing valve, and having a lower end air outlet, said lower end having means to alternately engage and disengage said seat of said injector valve thereby to control the flow of substance from said reservoir, and
   (e) a probe in fluid flow communication with the lower end of said injector tube, said probe having means to release compressed air immediately after said rapid closing valve is opened, into the adjoining soil for breaking up the same; and
   means for raising said tube responsive to the opening of said rapid closing valve to disengage said tube from said valve seat whereby compressed air is first discharge downwardly through said tube to said probe, followed by the opening of said injector valve to permit said substance to be discharged from said reservoir by entrainment with said compressed air.

2. Apparatus according to claim 1, characterized in that said reservoir is downwardly tapered toward said probe and, together with said injector valve, injector tube, and rapid closing valve, form a single structural unit.

3. Apparatus according to claim 1, further including means for mounting said injector tube adjustably and displaceably for the time delayed release of said injector valve seat following the opening of the rapid closing valve, said injector tube being fastened to a lift rod.

4. Apparatus according to claim 3, wherein said injector tube is mount adjustably on threads of said lift rod by means of a threaded nut, and compression spring means for longitudinally biasing said injector tube in a direction against the injector valve seat.

5. Apparatus according to claim 1, further characterized in that said reservoir is made of a transparent synthetic material, said reservoir including an inner chamber and a tubular sleeve extending through said inner chamber from said rapid closing valve in the direction of said injector valve seat, and wherein said injector tube is guided in an axially displaceable manner.

6. Apparatus according to claim 5, characterized in that said tubular sleeve is attached adjacent the upper portion immediately under the upper wall of said reservoir, said tubular portion having at least one transverse bore for the building of a pressure cushion over the substance in said reservoir, and a relief valve mounted on said reservoir.

7. Apparatus according to claim 1, further including a substance inlet means extending through said upper portion of said reservoir, and a closure adapted to engage a sealing rim formed on the bottom of said inlet means for terminating flow of said substance into said reservoir.

8. Apparatus according to claim 1, characterized in that said reservoir is mounted with a fastening fitting on a separable housing of said probe, said separable housing including a driver for said probe.

9. Apparatus according to claim 8, characterized in that said probe includes an inner tube that extends through the probe driver and said inner tube being supported at a termianl area in said fastening fitting of said reservoir under the injector valve seat.

10. Apparatus according to claim 9, further including a guide sleeve, said inner tube being associated with said guide sleeve to define an annular groove, and a gasket positioned at the top of a guide sleeve within said annular groove.

11. Apparatus according to claim 10, further characterized in that said inner tube includes a collar portion from which a pivoted lever projects in the radially outward direction an opening defined in the fastening fitting, the lever projecting through the defined opening.

12. Apparatus according to claim 8, wherein said separable housing includes a spacer ring mounted on the lower part of said separable housing, said separable housing containing an anvil, the anvil having a circumferential surface, said ring having sealing lips resting against the circumferential surface of said anvil and associated with said inner tube.

13. Apparatus according to claim 12, further including a holding strap, the holding strap mounting a bushing which surrounds said anvil, whereby the anvil is guided by said bushing.

14. Apparatus according to claim 11, further characterized in that the probe further includes a terminal area, and the inner tube has a closure head with a seal, and a jacket tube having at least one lateral outlet orifice adjacent the pointed end of the jacket tube, whereby said outlet orifice can be closed if no compressed air or substance is exiting by the rotation of the inner tube by pivoting the pivotal lever.

15. Apparatus according to claim 1, further including a rapid closing valve actuation means comprising a pneumatic cylinder, the pneumatic cylinder having a compressed air cylinder, a lift piston, a tubular lift rod interconnecting the lift piston and the injection tube and an air line from a pressure source, and wherein the injector tube is in fluid communication with said air line via an impact pressure chamber, said impact pressure chamber in part defined by said lift piston and occupying part of the compressed air cylinder, whereby during operation, the operating pressure in the injection tube and impact pressure chamber drops after breakup of the ground by the compressed air and probe causing the injection tube to be raised by the axial displacement of the lift piston for the time delayed release of the injector valve from the injector valve seat.

16. Apparatus according to claim 15, further characterized in that said compressed air cylinder for said injector valve is arranged coaxially over said pneumatic cylinder of said rapid closing valve and said air line is in fluid communication through the lift rod, said lift rod extending through said rapid closing valve, said penumatic cylinder, a tappet tube of said lift piston, and said lift piston itself.

17. Apparatus according to claim 16, further including a compression spring, said compression spring biasing the injector tube in a direction to cause the injector valve to seat, said compression spring located within the impact pressure chamber of the compressed air cylinder and in engagement with the lift piston.

18. Apparatus according to claim 17 characterized in that said lift piston includes an impact pressure surface facing the impact pressure chamber, said surface being larger than a second surface which defined the work chamber of the compressed air cylinder of the lift piston, so as to open the injection valve.

19. Apparatus according to claim 18, characterized in that said rapid closing valve includes a seal, with seal being between the piston of the pneumatic cylinder and the rapid closing valve by means of a piston tube, said piston tube being axially displaced about the lift rod of the injector tube.

20. Apparatus according to claim 19, further characterized in having a pressure chamber of the pneumatic cylinder for the opening, and a counter pressure chamber for the closing, of the rapid closing valve, and the work chambers of the compressed air cylinder each being supplied through separate control pressure lines, a directional valve for introducing the compressed air simultaneously into the pressure chamber of the pneumatic cylinder and in the work chamber of the compressed air cylinder, and including a pressure reducing valve in the compression cylinder pressure line whereby the level of the pressure of the compressed air passing into the work chamber of the compressed air cylinder is kept lower by a pressure reducing valve than the level of pressure of the compressed air introduced into the pressure chamber of the pneumatic cylinder.

* * * * *